Aug. 24, 1954
J. H. MILLER ET AL
2,687,512
APPARATUS RESPONSIVE TO PHASE ROTATION
Filed Aug. 4, 1953
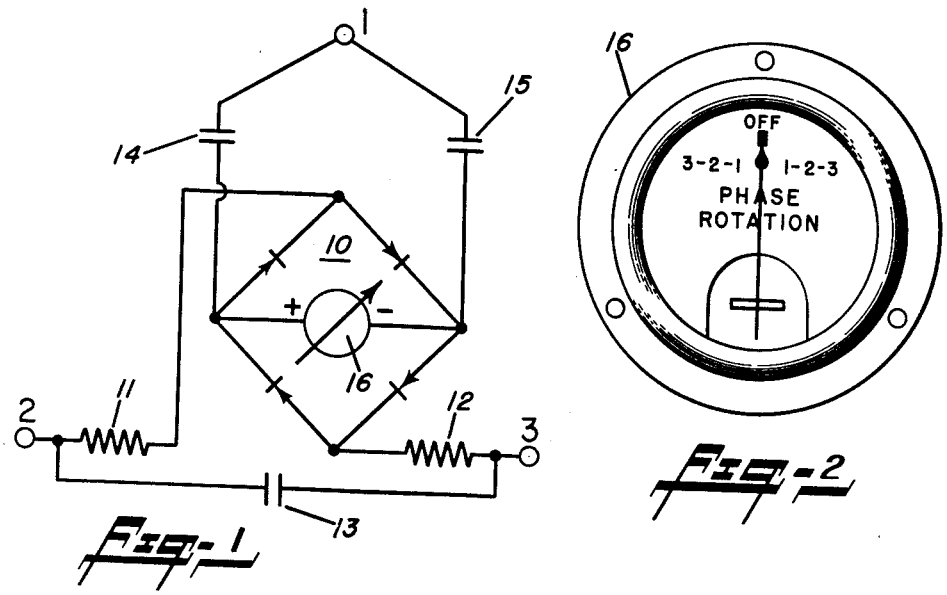
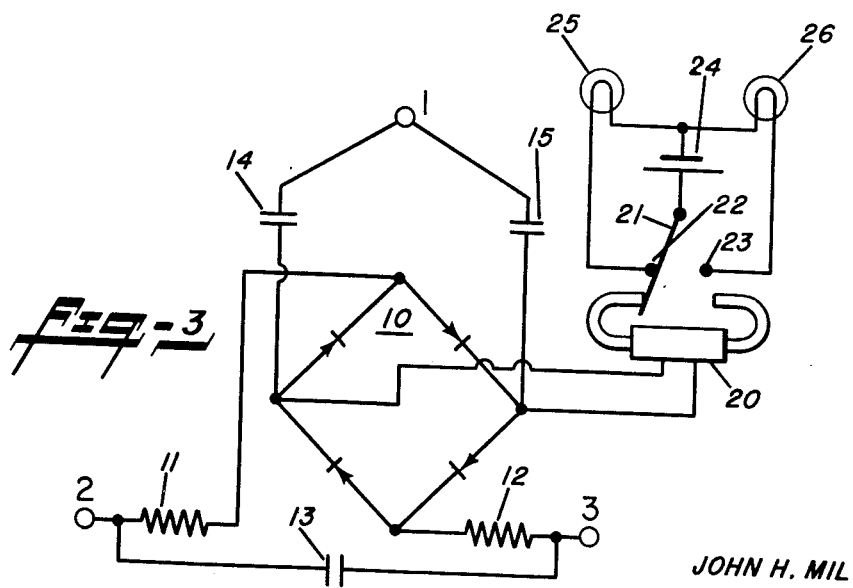
JOHN H. MILLER AND
ROSWELL W. GILBERT
INVENTORS
BY
*Taylor, Cifelli & Jurick*
ATTORNEYS Patented Aug. 24, 1954

2,687,512

UNITED STATES PATENT OFFICE 2,687,512

APPARATUS RESPONSIVE TO PHASE ROTATION

John H. Miller, Short Hills, and Roswell W. Gilbert, Montclair, N. J., assignors to Weston Electrical Instrument Corporation, Newark, N. J., a corporation of New Jersey Application August 4, 1953, Serial No. 372,275

4 Claims. (Cl. 324—86)

This invention relates to apparatus responsive to phase rotation and more particularly to a device of this type employing a novel arrangement of resistors, condensers and rectifiers, whereby D. C. energy is available to operate electrical devices in a sense depending upon the phase rotation of a polyphase system.

This application is a continuation-in-part application of our application Serial No. 173,752, filed July 14, 1950, now abandoned, and entitled "Apparatus Responsive to Phase Rotation."

Phase rotation indicators are employed to show the order of succession of the E. M. F. waves in a polyphase circuit such information being important when paralleling generators, connecting induction motors, replacing transformers, changing lines supplying any polyphase load, etc.

In general, phase rotation indicators comprise a rotatable aluminum disc driven by three shaded coils, the rotational direction of the disc being controlled by a suitable spring. A pointer secured to the shaft of the disc rotates in one direction when the phase rotation is 1-2-3, say to the right of the center zero position, and if the phase rotation is 3-2-1 the pointer will rotate to the left.

Such prior devices are of more or less special type whose appearance is not compatible with the conventional line of switch-board instruments.

In its simpler form our invention employs a direct-reading instrument of the ordinary permanent magnet, movable coil class for the performance of the particular function of indicating phase rotation. The circuit arrangement is such that there is available a significant quantity of D. C. energy whose polarity is reversed with reversal of phase, and such energy is employed to actuate a D. C. movable coil instrument, or other electrical apparatus, as will be described in detail hereinbelow.

An object of this invention is the provision of a phase-responsive electrical arrangement for use in a polyphase system, said arrangement providing a D. C. output whose polarity is reversed with reversal of phase.

An object of this invention is the provision of a phase-responsive arrangement comprising a rectifier bridge having input circuits connectable to a polyphase system, and reactive components in the bridge input circuits, whereby the bridge provides a D. C. output whose polarity reverses with reversal of phase.

An object of this invention is the provision of a phase rotation indicator comprising a rectifier bridge, three terminals for connection to a three-phase system, a branch connection between one terminal and opposed junctions of the bridge and including a reactive component in each of the branches, resistive components connected between the other terminals and the other opposed junctions of the bridge, and a D. C. indicating instrument connected across opposed bridge junctions.

An object of this invention is the provision of a device responsive to the phase rotation of a three phase system and comprising a rectifier bridge, three terminals for connection to the polyphase system, resistive components connected between two of said terminals and opposed junctions of the bridge, a reactive component connected across these two terminals, a pair of reactive components connected between the third terminal and the other opposed junctions of the bridge, and a direct-current-responsive device connected across the latter opposed junctions of the bridge.

An object of this invention is the provision of a device responsive to the phase rotation of a three phase system and comprising a rectifier bridge, three terminals for connection to a polyphase system, individual resistors connected between two such terminals and opposed junctions of the bridge, a condenser connected across these two terminals, a pair of condensers connected between the third terminal and the other opposed junctions of the bridge, and a direct-current-responsive device connected to the latter opposed bridge junctions.

These and other objects and advantages will be apparent from the following description when taken with the accompanying drawings illustrating several embodiments of the invention. The drawings are for purposes of illustration and are not to be construed as defining the scope or limits of the invention, reference being had for the latter purpose to the appended claims.

In the drawings wherein like reference characters denote like parts in the several views:

Figure 1 is a circuit diagram illustrating a phase rotation indicator made in accordance with this invention, and employing a D. C. indicating instrument;

Figure 2 is a front view of the indicating instrument; and

Figure 3 is a circuit diagram illustrating a polarized relay responsive to the output of the modulator bridge.

Referring now to Figure 1, our device comprises a three terminal arrangement such terminals being identified by the numerals 1, 2 and 3, and to which the three lines of a three phase system are connected when the device is placed into use. The rectifier bridge 10 is made up of four asymmetrical conductors, such as copper-oxide rectifiers, arranged in series with their direction of rectification continuous around the ring, as in a ring modulator and as shown. It is known that such a rectifier bridge provides a D. C. output across two opposed junctions, said output being proportional to the A. C. inputs applied across opposed pairs of bridge junctions. Also, the bridge is phase-sensitive providing a D. C. output having a polarity dependent upon the phase relationship of the A. C. input waves. As shown in the drawing the terminals 2 and 3 are connected to opposed bridge junctions through the resistors 11 and 12, respectively, and are connected to each other through the condenser 13. The latter is not functionally necessary for operation of the circuit but without such condenser the device will indicate a phase rotation in the event one of the lines become disconnected from the terminals 2 or 3. The other opposed bridge junctions are connected to the terminal 1 through the condensers 14, 15. Connected across these same bridge junctions is a D. C. indicating instrument 16 of the permanent magnet, movable coil type having a pointer rotationally responsive to the polarity and magnitude of the current flowing in the movable coil, as is well known in the art.

An analysis of the operation of the rectifier bridge shows that the deflection of the indicating instrument is a function of the phase and the magnitude of the two current components that are impressed across the diagonals of the bridge. The analysis is complex and is not presented here as the general operation of such modulator bridge is known to those familiar with this art. It may be stated that the direct current flow in the measuring circuit would be proportional to the products of the alternating components in the modulator bridge if the rectifier elements operated on a pure square law characteristic. However, the rectifier characteristics are such that the response approaches a linear relation and the instrument deflection is, therefore, not strictly proportional to the product but to some smaller value. The exact magnitude of the instrument deflection or the relationship between the instrument and the alternating current components is not particularly important as the essential requirement is that the instrument provide substantial deflections to opposite sides of the zero center position to indicate the phase relationship between the potentials impressed across the bridge diagonals.

The specific value of the resistors 11, 12 and condensers 14, 15, is determined by the voltage and frequency of the three phase system and the characteristics of the particular indicating instrument. In one practical embodiment of the invention the indicating instrument 16 was a zero-center milliammeter having a scale range of 1–0–1 ma. with a resistance of somewhat less than 100 ohms. For a three phase, 60 cycle system having 208 volts between phases, the resistors 11, 12 were 62,000 ohms, the condensers 14, 15 were 0.05 mf. each and the condenser 13 was 0.25 mf. With this arrangement the deflection of the milliammeter was about 0.9 ma., in the direction indicated, for a phase rotation 1–2–3; and in the opposite direction for a phase rotation 3–2–1. For other voltages and frequencies the value of the resistors and the reactance elements can be made in proportion to the stated values. From the standpoint of proper operation the condensers 14 and 15 should have an impedance, at the system frequency, of ½ to 2 times that of the resistors 11 and 12, while the condenser 13 should have an impedance of less than ½ that of such resistors.

When the order of succession of the E. M. F. waves is 1–2–3 the pointer of the indicating instrument 16 will assume a position to the right of the center position on the scale, whereas upon a phase rotation of 3–2–1 the pointer will assume a position to the left of such position. It will be apparent that the scale of the instrument may carry appropriate markings for conveying the actual phase rotation sequence to the observer, as shown in Figure 2. If the line to terminal #1 becomes disconnected the instrument will indicate zero, that is, the center scale position. If either phase 2 or 3 is lost the instrument will indicate approximately 3% of the normal deflection, the actual amount of such indication depending upon the value of the condenser 13 and if this condenser is made larger then such deflection of the instrument pointer is further reduced. As stated hereinabove, the condenser 13 is not functionally necessary but its omission will cause the instrument pointer to deflect slightly from the zero position when one of the phases becomes disconnected, thereby creating a condition of uncertainty unless the scale plate of the instrument is marked in zones of appropriate character.

It may here be pointed out that the modulator bridge, condensers and resistors are quite small and may conveniently be mounted in the case of the indicating instrument. Such instrument having a conventional pointer may be made to harmonize with other instruments on a switchboard. Alternatively, the instrument and the associated components disposed therein may be of the conventional, portable type.

While our invention results in a compact phase rotation indicator of positive operation it is not limited to such application. The D. C. output of the modulator bridge may be utilized for the direct operation of other D. C. polarity-discriminating devices.

As shown in Figure 3 the modulator bridge output is fed to a polarized relay 20 having a movable contact 21 and the stationary contacts 22, 23. The movable contact 21 may be connected to a source of power such as the battery 24 and the stationary contacts may be connected to the filament lamps 25, 26 having return leads connected to the other side of the battery, as shown. In this arrangement, a phase rotation sequence of 1–2–3 will result in a closure of the relay contacts 21, 22, thereby energizing the lamp 25. A reversal of the phase sequence to 3–2–1 results in a reversal of the polarity of the bridge output causing the relay contacts 21, 23 to close, thereby energizing the lamp 26. These lamps may be disposed within the instrument case in back of suitable windows marked in terms of phase rotation. Illumination of one or the other of the lamps may be observed from a distance to ascertain the phase rotation.

Having described an arrangement whereby a significant quantity of D. C. energy of reversible polarity is made available in response to a reversal of phase rotation, those skilled in this art will have no difficulty in developing other specific applications of the invention. For example, it is apparent the polarized relay shown in Figure 3 can be arranged to actuate a circuit breaker to prevent apparatus from being connected incorrectly to a polyphase line.

Having now described our invention in detail various changes and modifications will suggest themselves to those skilled in the art without thereby departing from the spirit and scope of the invention as set forth in the following claims.

We claim:

1. A device for indicating the relative phase rotation sequence of a three wire polyphase system having a given frequency and substantially equal voltages between wires, said device comprising three terminals for individual connection to the three wires of the polyphase system; a continuous ring rectifier having four junctions; a resistor connected between one bridge junction and a first terminal; a resistor connected between the opposed bridge junction and a second terminal; a pair of condensers individually connected between the other opposed bridge junctions and the third terminal, each said condenser having an impedance at the given frequency of ½ to 2 times that of the individual said resistors; and polarity-discriminating means connected across the said other opposed bridge junctions.

2. The invention as recited in claim 1, wherein the polarity-discriminating means is an indicating instrument having a pointer cooperating with a scale and a movable coil connected across the said other opposed bridge junctions.

3. The invention as recited in claim 2 including a condenser connected across the said first and second terminals said condenser having an impedance at the given frequency of less than ½ that of both said resistors.

4. A device for indicating the relative phase rotation sequence of a three wire polyphase system having a given frequency and substantially equal voltages between wires, said device comprising three terminals for individual connection to the three wires of the polyphase system; a continuous ring rectifier having four junctions; a resistor connected between one bridge junction and a first terminal; a resistor connected between the opposed bridge junction and a second terminal; a pair of condensers individually connected between the other opposed bridge junctions and the third terminal, each said condenser having an impedance at the given frequency of ½ to 2 times that of the individual said resistors; an indicating instrument having a movable coil connected across the said other opposed bridge junctions, said instrument including a pointer cooperating with a scale marked 3-2-1 and 1-2-3 to either side of center; and a condenser connected across the said first and second terminals said condenser having an impedance at the given frequency of less than ½ that of both said resistors.

References Cited in the file of this patent

UNITED STATES PATENTS

| Number | Name | Date |
|---|---|---|
| 2,521,522 | Keitley | Sept. 5, 1950 |